Dec. 21, 1926.                                                      1,611,833
                         C. J. HAHN ET AL
                              METER
                       Filed July 28, 1922          4 Sheets-Sheet 1

C. J. Hahn
F. S. Hummel INVENTORS

BY Victor J. Evans
                    ATTORNEY

WITNESS:

Dec. 21, 1926.
1,611,833
C. J. HAHN ET AL
METER
Filed July 28, 1922
4 Sheets-Sheet 2

C.J.Hahn,
F.S.Hummel,
INVENTOR

BY Victor J. Evans
ATTORNEY

WITNESS:

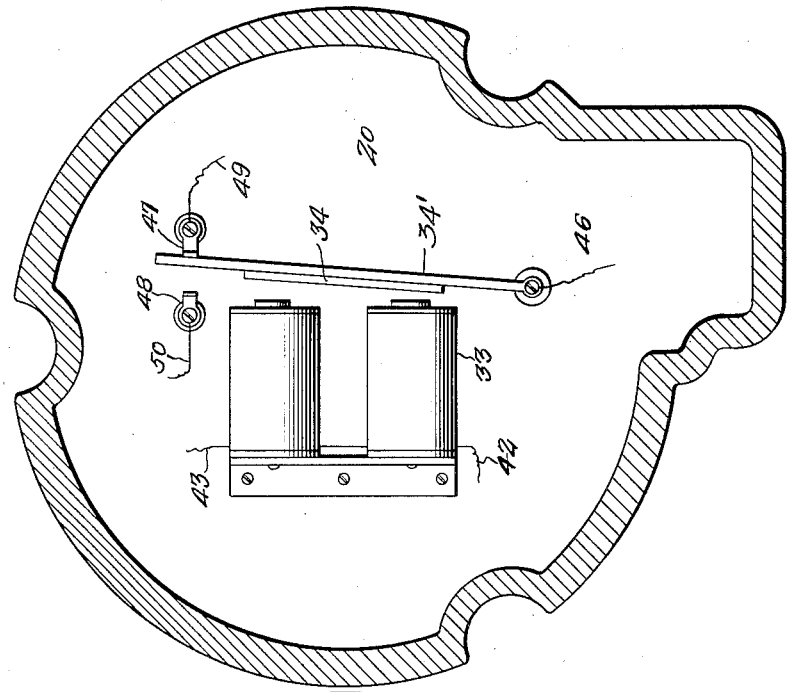
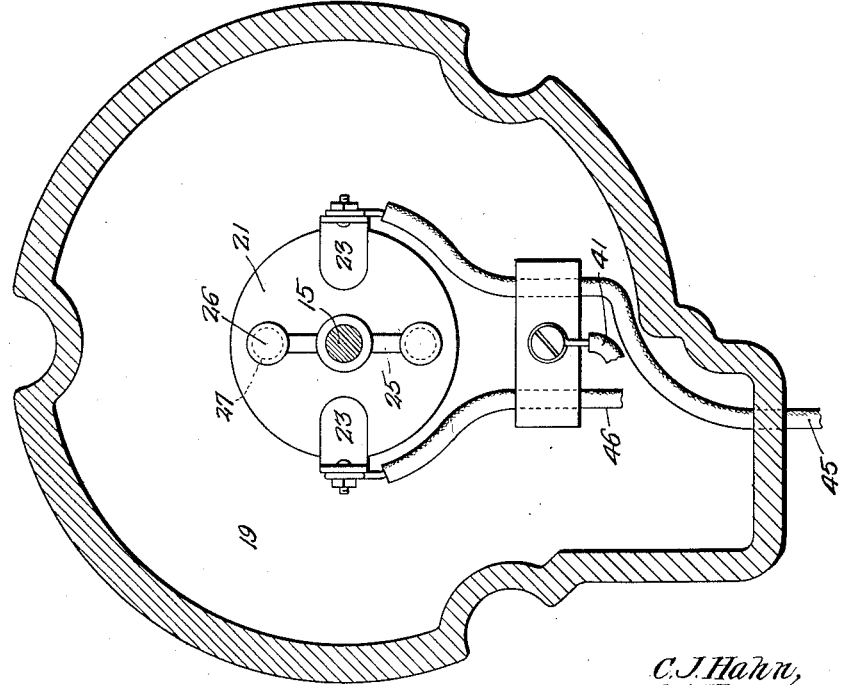

Dec. 21, 1926.                                                      1,611,833
C. J. HAHN ET AL
METER
Filed July 28, 1922        4 Sheets-Sheet 4
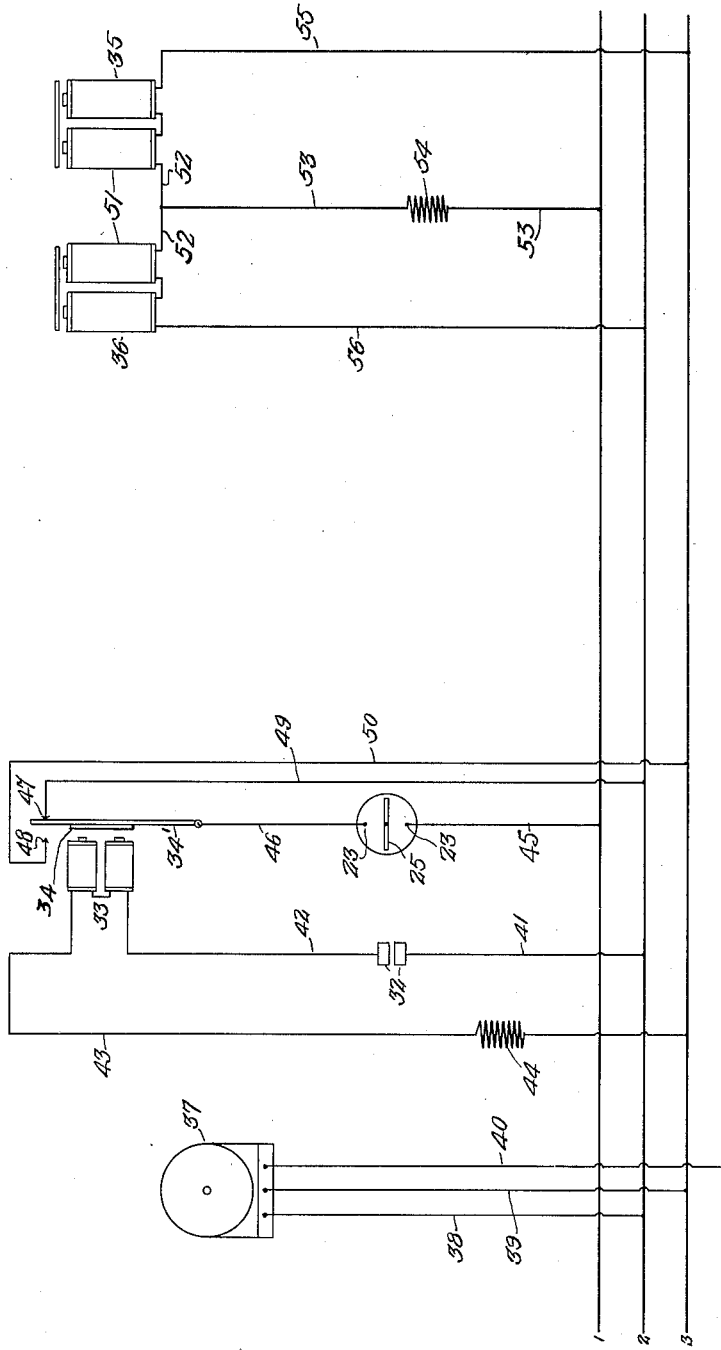
C.J.Hahn,
E.S.Hummel, INVENTORS
BY Victor J. Evans
ATTORNEY Patented Dec. 21, 1926.

1,611,833

UNITED STATES PATENT OFFICE.

CLARENCE J. HAHN AND FRANK S. HUMMEL, OF BUFFALO, NEW YORK.

METER.

Application filed July 28, 1922. Serial No. 578,212.

This invention relates generally to devices for measuring flowing liquids and has for an object the provision of a liquid meter which is especially designed for measuring the output of oil wells.

Another object of the invention is the provision of a liquid meter, by means of which the character of the liquid passing therethrough may be determined, thus, in the case of an oil well the meter will cause to be indicated upon a suitable instrument, either oil or water, and the quantity of each which passes through said meter, with sufficient accuracy to determine the operating condition of the well.

With the above and other objects in view, the invention further includes the following novel features and details of construction, to be hereinafter more fully described, illustrated in the accompanying drawings and pointed out in the appended claims.

In the drawings:—

Figure 5 is a section on the line 5—5 of Figure 3.

Figure 6 is a diagrammatic view showing the manner of connecting the meter to oil and water indicators.

Figure 7 is a section on the line 7—7 of Figure 3.

Figure 2:
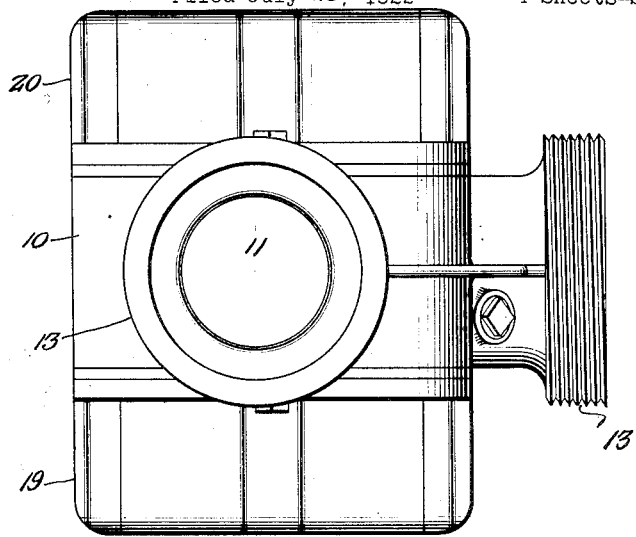
Figure 2 is a top plan view of the same.
Figure 1:
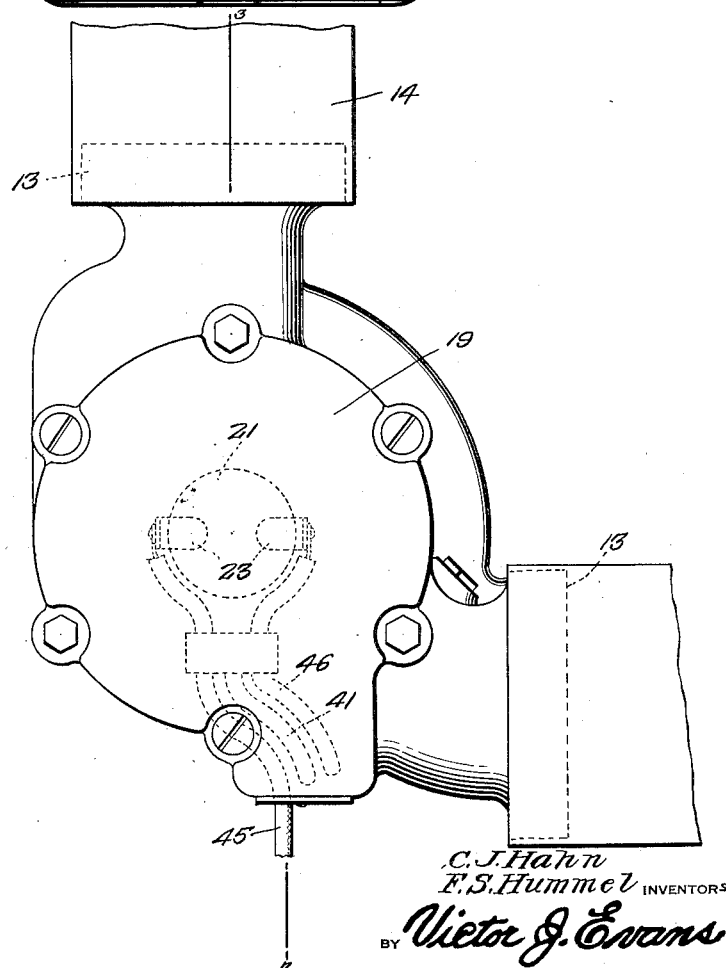
Figure 1 is an elevation of the meter.

Referring in detail to the drawings, wherein like characters of reference denote corresponding parts, the meter is shown as comprising a housing which includes a rotor chamber 10 having an inlet port 11 and an outlet port 12 which ports are surrounded by threaded flanges 13 to provide means for connecting the meter in a pipe line, a portion of which is indicated at 14. Mounted within the rotor chamber 10 upon a shaft 15 is a wheel or rotor 16 which has extending from its periphery spaced blades 17 which act in conjunction with the inner walls of the chamber 10 to provide measuring pockets 18. As the rotor is located in the path of the liquid passing through the chamber 10, the said liquid will enter the pockets 18 and pass through in predetermined quantities, the amount being determined by the speed of rotation of the rotor.

It is the purpose of the invention to control the speed of rotation of the rotor by the weight of the liquid within the pockets 18 and by a head of liquid within the pipe line 14 and for this purpose the section of the pipe line which is connected to the inlet end 11 of the meter is vertically arranged for a portion of its length. The liquid head in the pipe line and inlet will consequently control the speed of operation of the rotor.

Figure 3:
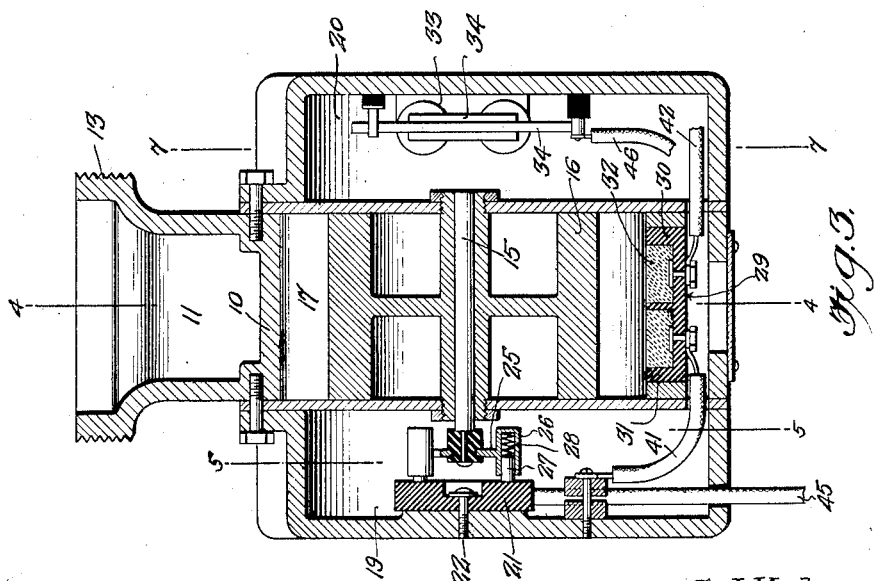
Figure 3 is a section on the line 3—3 of Figure 1.

Arranged upon opposite sides of the rotor chamber are chambers or compartments 19 and 20, the first named compartment being designed to provide a housing for an electric switch whose operation is controlled by the rotor 16. For this purpose there is provided an insulating base block 21 which is secured to the inner wall of the compartment 19 as shown at 22 and which is provided with oppositely arranged contacts 23. Secured to the end of the shaft 15 is a member 25 which is provided with radially disposed arms having sockets 26 at their outer ends and is insulated from the shaft as shown in Fig. 3 of the drawing. Slidingly mounted in these sockets are contact elements 27 adapted to operate over the face of the base block 21 and alternately engage the stationary contacts 23, being yieldingly urged in such engagement by means of springs 28 arranged within the sockets and bearing against the inner ends of the contact members 27. It will thus be seen that the contact members 23 will be engaged at each half revolution of the rotor 16 to momentarily close the switch.

In addition to the switch just described, there is provided another circuit closer 29. This latter circuit closer is located within the bottom of the rotor chamber 10 and includes an insulating base 30 having spaced pockets or seats 31 therein for the reception of spaced contact members, herein shown as two volumes of mercury and indicated at 32. The circuit closer 29 is designed to be operated by the flow of water through the meter and as the latter is designed for use in measuring the flow of water and oil, the use of mercury contact members will prevent the accumulation of paraffine upon these contacts and will always provide a proper connection which is free from the insulating effects of grease and oil.

The circuit closer 29 is connected in circuit with an electromagnet 33 which together with an armature 34, are located in the compartment 20 and when water from an oil well passes over the mercury contacts 32 it will bridge these contacts and close a circuit through the electromagnet 33 as will be later described.

The circuit closers 21 and 29 are designed to control the operation of electrically operated indicators, one of such indicators being for water and the other for oil and are shown at 35 and 36 respectively. Current for the operation of these indicators may be supplied from any suitable source and where an oil well is pumped by the use of an electric motor, these indicators may be included on circuit with a motor as shown in Figure 6 of the drawings. This motor is shown at 37 as of the three-phase type and receives current from a suitable source, for example line wires, the latter being indicated at 1, 2, 3 and 4 in Figure 6 of the drawings. Conductors 38, 39 and 40 connect the motor 37 with the line wires 2, 3 and 4 respectively. The mercury contacts 32 are tapped on to the line wires 2 and 3, the line wire 2 being connected to one of the contacts 32 by means of a conductor 41, while the other mercury contact 32 is connected by a conductor 42 to the coils of the electromagnet 33, a conductor 43 connecting these coils to the line wire 3. Where practical, a resistance 44 may be included in the conductor 43.

One of the contacts 23 of the rotor operated switch is connected to the line wire 1 by means of a conductor 45, while the other contact 23 of this switch is connected to a switch element 34' by means of a conductor 46. The switch element 34' has secured thereto the armature 34 as clearly shown in Figures 6 and 7 of the drawings. This switch element operates between spaced contacts 47 and 48, the former being connected to the line wire 2 by means of a conductor 49, while the last mentioned contact 48 is connected to the line wire 3 by means of a conductor 50. The switch element 34' and the contacts 47 and 48 form a switch for transferring the current from the circuit of the oil indicator 36 to the circuit of the water indicator 35 as will be presently described.

The meter and motor are preferably located at a well, while the water and oil indicators 35 and 36 may be located at a point remote from the well and are in electrical connection with the electric elements of the meter through the line wires mentioned. For this purpose, the indicators which include electromagnets 51, are connected by a conductor 52 and this conductor is tapped on to the line wire 1 by means of a conductor 53. Where practical, this conductor 53 may include resistance 54. The water indicator 35 is connected to the line wire 3 by a conductor 55, while the oil indicator 36 is connected to the line wire 2 by a conductor 56.

Figure 4:
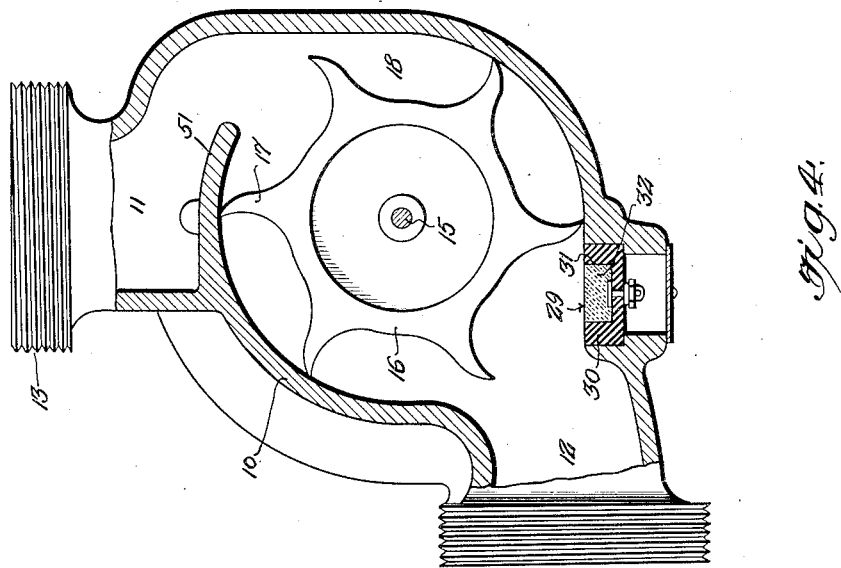
Figure 4 is a section taken approximately on the line 4—4 of Figure 3 and shows the rotor in side elevation.

Pressure for the operation of the rotor 16 is furnished by a head of liquid within the vertical portion 14 of the water line and in order to control the direction of rotation of the rotor and to prevent an excessive amount of pressure against the spaced flanges 17, there is provided within the entrance port of the rotor casing, a baffle wall or flange 51. By reference to Figure 4 of the drawings, it will be seen that fluid entering the rotor chamber, will be directed into the pockets 18 of the rotor and will be permitted to travel through the rotor chamber in quantities regulated by the speed of the rotor. As the rotor is operated, momentary contact is effected through the brushes 27 and the contact plates 23, so that when oil is passing through the meter, current will flow from the line wire 2, through the conductor 56, the coils of the oil indicator 36, the conductor 52, the conductor 53 and resistance 54 where the latter is used, line wire 1, the conductor 45 to the contacts 23, which contacts are momentarily bridged at each half revolution of the rotor. As the electromagnet 33 is de-energized, current will flow through the conductor 46, the switch element 34', the contact 47, the conductor 49 to the line wire 2. Thus, at each half revolution of the rotor, the contacts 23 will be momentarily bridged and the oil indicator will continue to operate as long as oil is passing through the meter, each bridging of the contacts 23 being indicated by the oil indicator.

Should water flow from the well instead of oil, the water passing over the mercury contacts 32 will bridge the space between said contacts and current will flow from the line wire 3, through the conductor 43, and the resistance 44, the coils 33, the conductor 42, the contacts 32 and the conductor 41 to the line wire 2. This will energize the coils 33 so as to attract the armature 34 so that the switch element 34' will then engage the contact 48, so that current will flow from the line wire 3 through the conductor 50, the contact 48, the switch element 34', the conductor 46, the contacts 23 of the switch, the conductor 45, the line wire 1, the conductor 53 and its resistance 54, the conductor 52, the coils of the water indicator 35 and through the conductor 55 to the line wire 3. Briefly stated, water passing through the meter and bridging the contacts 32 will operate the armature 34 together with its switch element 34' to direct current through the water indicator 35, instead of the oil indicator 36 so that the former instead of the latter will be operated.

The invention is susceptible of various changes in its form, proportions and minor details of construction and the right is herein reserved to make such changes as properly fall within the scope of the appended claims.

Having described the invention what is claimed is:—

1. The combination with an electrically actuated oil and water indicator, of a liquid measuring device embodying a housing, a liquid actuated element rotatably mounted in said housing, inlet and outlet means for said housing whereby liquid will pass therethrough in a manner to operate the element, a switch operated by the element and being normally in circuit with the oil indicator, a pair of contact members arranged in the path of the liquid, a switch normally in circuit with the switch first mentioned and the oil indicator respectively, and electro-magnetic means in circuit with the contact members for moving the second mentioned switch to change the circuit through the oil indicator to the water indicator when water passes through the measuring device.

2. The combination with an electrically actuated oil and water indicator, of a housing having inlet and outlet openings, a rotor mounted within the housing and being provided with measuring pockets to receive liquid passing through the housing, said liquid being adapted to rotate the rotor through the medium of the pockets thereof, switch elements mounted to rotate with the rotor, stationary contact members arranged in the path of the switch elements, a pair of switch contact members arranged in the path of the liquid, a switch normally in circuit with said switch elements and said stationary contact members respectively and also with the oil indicator, and an electro-magnet in the circuit with the said pair of switch contact members for moving said switch to change the circuit through the oil indicator to the water indicator when water passes over the pair of switch contact members which closes the circuit to the electro-magnet.

3. The combination with an oil indicator and a water indicator, of a liquid measuring device comprising a housing and provided with an inlet and outlet port, a pocketed member rotatably mounted within the housing between the ports whereby liquid in passing through the housing will cause rotation of the member, a baffle arranged adjacent the inlet port in advance of the member, a switch including oppositely arranged contacting elements secured interiorly on one side wall of the housing and a pair of spring pressed contact members carried by the member for rotation therewith and being arranged to engage the contact elements, a pair of non-corroding spaced switch contact members arranged in the path of liquid and adapted to be acted upon by the water passing through the housing for closing a circuit, a switch normally in circuit with the switch first mentioned and the oil indicator respectively and means in the circuit with said spaced switch contact members for moving said last mentioned switch to change the circuit from the oil indicator to the water indicator when water passes through the measuring device and contacts the pair of switch contact members.

In testimony whereof we affix our signatures.

CLARENCE J. HAHN.
FRANK S. HUMMEL.